US007603469B2

(12) United States Patent
Fletcher et al.

(10) Patent No.: US 7,603,469 B2
(45) Date of Patent: Oct. 13, 2009

(54) PROVISIONING AGGREGATED SERVICES IN A DISTRIBUTED COMPUTING ENVIRONMENT

(75) Inventors: James C. Fletcher, Apex, NC (US); David B. Lindquist, Raleigh, NC (US); Michael C. Wanderski, Durham, NC (US); Ajamu A. Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1516 days.

(21) Appl. No.: 10/047,811

(22) Filed: Jan. 15, 2002

(65) Prior Publication Data

US 2003/0135628 A1    Jul. 17, 2003

(51) Int. Cl.
*G06F 15/16* (2006.01)
(52) U.S. Cl. .................. 709/229; 709/242; 709/201; 709/225; 709/206; 726/2; 726/4; 726/5; 726/12; 726/18; 713/185; 713/164
(58) Field of Classification Search .......... 709/229, 709/202, 220, 328, 201, 217, 224, 227, 242, 709/225, 206; 707/10; 705/10, 57
See application file for complete search history.

(56) References Cited

U.S. PATENT DOCUMENTS

| 5,715,453 | A | 2/1998 | Stewart |
| 5,884,317 | A | 3/1999 | Cline et al. |
| 6,189,138 | B1 | 2/2001 | Fowlow et al. |
| 6,327,628 | B1 | 12/2001 | Anuff et al. |
| 6,516,349 | B1 | 2/2003 | Lieberman |
| 6,560,633 | B1 * | 5/2003 | Roberts et al. ............... 709/202 |
| 6,564,251 | B2 | 5/2003 | Katariya et al. |
| 6,643,650 | B1 | 11/2003 | Slaughter et al. |
| 6,681,221 | B1 | 1/2004 | Jacobs |
| 6,738,964 | B1 | 5/2004 | Zink et al. |
| 6,792,605 | B1 | 9/2004 | Roberts et al. |

(Continued)

FOREIGN PATENT DOCUMENTS

EP    0077653    11/2001

(Continued)

OTHER PUBLICATIONS

Czerwinski s e, et al, "An Architecture for a Secure Service Discovery Service", Mobicom '99. Proceedings of the $5^{th}$ annual ACM/IEEE International Conference on Mobile Computing and Networking. Seattle, Wa. Aug. 15-20, 1999. pp. 24-35, XP000896069.

(Continued)

*Primary Examiner*—Jude J Jean Gilles
(74) *Attorney, Agent, or Firm*—Marcia L. Doubet

(57) ABSTRACT

Methods, systems, and computer program products are disclosed for provisioning software resources used with aggregated web services. The disclosed techniques enable heterogeneous identity systems to be joined in the dynamic, runtime web services integration environment. Authentication and authorization may now be performed for the aggregated service, as well as for its sub-services. SOAP ("Simple Object Access Protocol") messages, as an example, may be used to relay identity information among distributed services, whereby credentials may be specified in the SOAP message header to accompany a service request specified in the SOAP message body.

15 Claims, 14 Drawing Sheets

U.S. PATENT DOCUMENTS

| | | | |
|---|---|---|---|
| 6,829,630 | B1 | 12/2004 | Pajak et al. |
| 6,839,680 | B1* | 1/2005 | Liu et al. .................... 705/10 |
| 6,851,088 | B1 | 2/2005 | Conner et al. |
| 6,857,008 | B1 | 2/2005 | Shenefiel |
| 6,920,461 | B2 | 7/2005 | Hejlsberg et al. |
| 7,013,469 | B2 | 3/2006 | Smith et al. |
| 7,017,162 | B2 | 3/2006 | Smith et al. |
| 2001/0007976 | A1 | 7/2001 | Thompson et al. |
| 2001/0034771 | A1 | 10/2001 | Hutsch et al. |
| 2002/0046301 | A1* | 4/2002 | Shannon et al. ............ 709/328 |
| 2002/0059526 | A1 | 5/2002 | Dillon et al. |
| 2002/0065946 | A1 | 5/2002 | Narayan |
| 2002/0067370 | A1 | 6/2002 | Forney et al. |
| 2002/0111848 | A1 | 8/2002 | White |
| 2002/0142760 | A1 | 10/2002 | Gidron et al. |
| 2002/0158899 | A1 | 10/2002 | Raymond |
| 2002/0174178 | A1 | 11/2002 | Stawikowski |
| 2002/0184070 | A1 | 12/2002 | Chen et al. |
| 2002/0198973 | A1 | 12/2002 | Besaw |
| 2003/0005090 | A1* | 1/2003 | Sullivan et al. ............ 709/220 |

FOREIGN PATENT DOCUMENTS

| | | |
|---|---|---|
| EP | 0186486 | 11/2001 |
| JP | 10302004 | 11/1998 |
| JP | 20010290724 | 10/2001 |
| WO | 99/50756 A1 | 10/1999 |
| WO | 00/77653 A1 | 12/2000 |
| WO | 01/86486 A2 | 11/2001 |

OTHER PUBLICATIONS

Lai C, et al: "User Authentication and Authorization in the Javaplatform", Computer Security Applications Conference, 1999. Proceedings. 15th annual Phoenix, Az, USA Dec. 6-10, 1999. Los Alamitos, CA, USA, IEEE Comput. Soc. pp. 285-290, XP010368605.

D. Ferguson: "Technical and Product Architecture and Roadmap" IBM Web Services, Online, May 2001, pp. 1-42, XP002272181. Retrieved from Internet: URL: www-306.ibm.com/software/solutions/ webservices/pdf/roadmap.pdf 'retrieved on Mar. 2, 2004. The whole document.

Caswell et al. "Using service models for management of internet services", Hewlett Packard publication available at www.hpl.hp.com/techreports'. published Mar. 1999.

Gaedke et al. "Supporting compositional reuse in component-based web engineering", Symposium on Applied Computing 2000, Mar. 2000, pp. 927-933.

Irani, Romin. "An Introduction to ebXML: Collaborative Electronic Business is here to stay". Jul. 11, 2001. Online article from Web Services Architect (webservicesarchitect.co.

D. Ferguson, "Technical and Product Architecture and Road map", IBM Web Services, 2001 3. pp. 1-42 <URL:http://www-306.ibm.com/software/solutions/WebServices/pdf/roadmap.pdf>.

Agrawal, et al., "Vinci: a service-oriented architecture for rapid development of web applications", International World Wide Web Conference, pp. 355-365, 2001.

Zirpins, et al., "Advanced concepts for next generation portals", Database and Expert Systems Applications, pp. 501-506, 2001.

* cited by examiner

```xml
<?xml version="1.0"?>
<definitions
    name="Deployment"
    targetNamespace="http://portal-definitions/Deployment.wsdl"
    xmlns:tns="http://portal-definitions/Deployment.wsdl"
    xmlns:wsfl="http://schemas.xmlsoap.org/wsfl/"
    xmlns="http://schemas.xmlsoap.org/wsdl/">

<message name="getDisplayNameInput">
    <part name="displayNameInput" element="xsd:nil"/>
</message>
<message name="getDisplayNameOutput">
    <part name="displayNameOutput" element="xsd:string"/>
</message>
<message name="getDisplayIcon16x16Input">
    <part name="displayIcon16x16Input" element="xsd:nil"/>
</message>
<message name="getDisplayIcon16x16Output">
    <part name="displayIcon16x16Output" element="xsd:image"/>
</message>
...

<portType name="DeploymentPortType">
    <operation name="getDisplayName">
        <input message="tns:getDisplayNameInput"/>
        <output message="tns:getDisplayNameOutput"/>
    </operation>
    <operation name="getDisplayIcon16x16">
        <input message="tns:getDisplayIcon16x16Input"/>
        <output message="tns:getDisplayIcon16x16Output"/>
    </operation>
    ...
</portType>
</definitions>
```

- 310: definitions block
- 320: message block
- 330: portType block

360
```
<?xml version="1.0"?>
<definitions
    name="System"
    targetNamespace="http://portal-definitions/System.wsdl"
    xmlns:tns="http://portal-definitions/System.wsdl"
    xmlns:wsfl="http://schemas.xmlsoap.org/wsfl/"
    xmlns="http://schemas.xmlsoap.org/wsdl/">
```

370
```
<types>
    <schema xmlns="http://www.w3.org/2000/10/XMLSchema">
        <element name="Event">
            <complexType>
                <all>
                    <element name="uuid" type="xsd:string/>
                    <element name="type" type="xsd:string/>
                    <element name="when" type="xsd:date/>
                </all>
            </complexType>
        </element>
    </schema>
</types>
...
```

FIG. 3B2

```
380  <message name="logEventReceive">
        <part name="logEventInput" element="tns:Event"/>
     </message>
     <message name="reportInput">
        <part name="reportUsageResource" element="xsd:string"/>
        <part name="reportUsageQuantity" element="xsd:integer"/>
     </message>
     <message name="reportOutput">
        <part name="reportReturnCode" element="xsd:string"/>
     </message>
     ...
390  <portType name="SystemPortType">
         <operation name="logEvent">
             <input message="tns:logEventReceive"/>
         </operation>
         <operation name="reportUsage">
             <input message="tns:reportInput"/>
             <output message="tns:reportOutput"/>
         <operation/>
     ...
     </portType>
     ...
     </definitions>
```

FIG. 4
410 Service Flow
420 Service Discovery
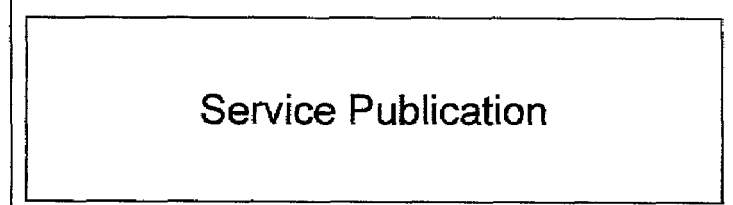
430 Service Publication
440 Service Description
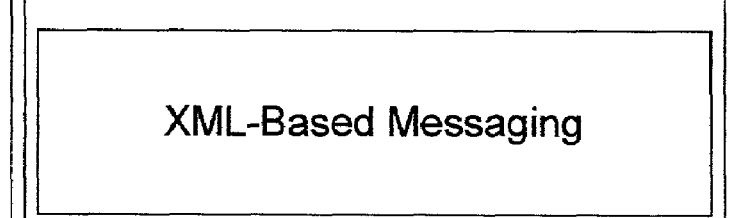
450 XML-Based Messaging
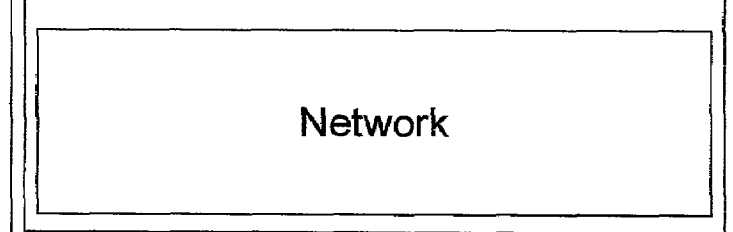
460 Network

502
```
<message name="InResolveProvisioningIDRequest">
  <part name="authToken" type="xsd:string"/>
</message>
```

504
```
<message name="OutResolveProvisioningIDResponse">
  <part name="Identifier" type="xsd:string"/>
</message>
```

506
```
<message name="InResolveUsersRequest">
  <part name="authToken" type="xsd:string"/>
  <part name="provID" type="xsd:string"/>
</message>
```

508
```
<message name="OutResolveUsersResponse">
  <part name="UserSet" type="SOAP-ENC:Array"/>
</message>
```

510
```
<message name="InCreateUserProfileRequest">
  <part name="authToken" type="xsd:string"/>
  <part name="provID" type="xsd:string"/>
  <part name="userID" type="xsd:string"/>
  <part name="password" type="xsd:string"/>
  <part name="FullName" type=xsd:string"/>
  <part name="accessRights" type="SOAP-ENC:Array"/>
</message>
```

512
```
<message name="OutCreateUserProfileResponse>
  <part name="result" type="xsd:boolean"/>
</message>
```

FIG. 5B

```
514    <message name="InQueryUserProfileRequest">
         <part name="authToken" type="xsd:string"/>
         <part name="provID" type="xsd:string"/>
         <part name="userID" type="xsd:string"/>
       <message>

516    <message name="OutQueryUserProfileResponse">
         <part name="password" type="xsd:string"/>
         <part name="FullName" type=xsd:string"/>
         <part name="accessRights" type="SOAP-ENC:Array"/>
       </message>

518    <message name="InUpdateUserProfileRequest">
         <part name="authToken" type="xsd:string"/>
         <part name="provID" type="xsd:string"/>
         <part name="userID" type="xsd:string"/>
         <part name="password" type="xsd:string"/>
         <part name="FullName" type=xsd:string"/>
         <part name="accessRights" type="SOAP-ENC:Array"/>
       </message>

520    <message name="OutUpdateUserProfileResponse">
         <part name="result" type="xsd:boolean"/>
       </message>

522    <message name="InDeleteUserProfileRequest">
         <part name="authToken" type="xsd:string"/>
         <part name="provID" type="xsd:string"/>
         <part name="userID" type="xsd:string"/>
       </message>
```

FIG. 5C

```
524    <message name="OutDeleteUserProfileResponse">
         <part name="result" type="xsd:boolean"/>
       </message>

526    <message name="InSetConfigParameterRequest">
         <part name="authToken" type="xsd:string"/>
         <part name="provID" type="xsd:string"/>
         <part name="userID" type="xsd:string"/>
         <part name="parameterName" type="xsd:string"/>
         <part name="parameterValue" type="xsd:string"/>
       </message>

528    <message name="OutSetConfigParameterResponse">
         <part name="result" type="xsd:boolean"/>
       </message>

530    <message name="InGetConfigParameterRequest">
         <part name="authToken" type="xsd:string"/>
         <part name="provID" type="xsd:string"/>
         <part name="userID" type="xsd:string"/>
         <part name="parameterName" type="xsd:string"/>
       </message>

532    <message name="OutGetConfigParameterResponse">
         <part name="parameterValue" type="xsd:string"/>
       </message>
```

FIG. 5D

```
550  <portType name="ProvisioningService">
552    <operation name="ResolveProvisioningID">
         <input message="InResolveProvisioningIDRequest"/>
         <output message="OutResolveProvisioningIDResponse"/>
       </operation>

554    <operation name="ResolveUsers">
         <input message="InResolveUsersRequest"/>
         <output message="OutResolveUsersResponse"/>
       </operation>

556    <operation name="CreateUserProfile">
         <input message="InCreateUserProfileRequest"/>
         <output message="OutCreateUserProfileResponse"/>
       </operation>

558    <operation name="QueryUserProfile">
         <input message="InQueryUserProfileRequest"/>
         <output message="OutQueryUserProfileResponse"/>
       </operation>

560    <operation name="UpdateUserProfile"/>
         <input message="InUpdateUserProfileRequest"/>
         <output message="OutUpdateUserProfileResponse"/>
       </operation>
```

FIG. 5E

```
562    <operation name="DeleteUserProfile"/>
         <input message="InDeleteUserProfileRequest"/>
         <output message="OutDeleteUserProfileResponse"/>
       </operation>

564    <operation name="SetConfigParameter">
         <input message="InSetConfigParameterRequest"/>
         <output message="OutSetConfigParameterResponse"/>
       </operation>

566    <operation name="GetConfigParameter"/>
         <input message="InGetConfigParameterRequest"/>
         <output message="OutGetConfigParameterResponse"/>
       </operation>
     </portType>
```

FIG. 7A
(Prior Art)

```
SOAP-ENV:Envelope xmlns:SOAP-ENV="http://schemas.xmlsoap.org/soap/envelope/">
<SOAP-ENV:Header>
<SOAP-SEC:Signature xmlns:SOAP-SEC="http://schemas.xmlsoap.org/soap/security/2000-12"
SOAP-ENV:actor="some-URI"
SOAP-ENV:mustUnderstand="1">
<ds:Signature xmlns:ds="http://www.w3.org/2000/09/xmldsig#">
  <ds:SignedInfo>
   <ds:CanonicalizationMethod Algorithm="http://www.w3.org/TR/2000/CR-xml-c14n-20001026">
   </ds:CanonicalizationMethod>
   <ds:SignatureMethod Algorithm="http://www.w3.org/2000/09/xmldsig#dsa-sha1"/>
   <ds:Reference URI="#Body">
    <ds:Transforms>
     <ds:Transform Algorithm="http://www.w3.org/TR/2000/CR-xml-c14n-20001026"/>
    </ds:Transforms>
    <ds:DigestMethod Algorithm="http://www.w3.org/2000/09/xmldsig#sha1"/>
    <ds:DigestValue>j6lwx3rvEPO0vKtMup4NbeVu8nk=</ds:DigestValue>
   </ds:Reference>
  </ds:SignedInfo>
  <ds:SignatureValue>MC0CFFrVLtRlk=...</ds:SignatureValue>
 </ds:Signature>
</SOAP-SEC:Signature>
</SOAP-ENV:Header>
```

700

710

720

PROVISIONING AGGREGATED SERVICES IN A DISTRIBUTED COMPUTING ENVIRONMENT

RELATED INVENTIONS

The present invention is related to U.S. Pat. No. 6,985,939 (Ser. No. 09/955,788), which is titled "Building Distributed Software Services as Aggregations of Other Services"; U.S. Pat. No. 7,035,944 (Ser. No. 09/956,268), which is titled "Programmatic Management of Software Resources in a Content Framework Environment"; and U.S. Pat. No. 7,343,428 (Ser. No. 09/956,276), which is titled "Dynamic, Real-Time Integration of Software Resources through Services of a Content Framwork", all of which are commonly assigned to International Business Machines Corporation and which were filed on Sep. 19, 2001. These U.S. patents are referred to herein as "the related inventions", and are hereby incorporated herein by reference.

BACKGROUND OF THE INVENTION

1. Field of the Invention

The present invention relates to computer software, and deals more particularly with techniques for provisioning aggregated services in a distributed computing environment.

2. Description of the Related Art

The popularity of distributed computing networks and network computing has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

An area where advances are being made in distributed computing is in the so-called "web services" initiative. This initiative is also commonly referred to as the "service-oriented architecture" for distributed computing. Web services are a rapidly emerging technology for distributed application integration in the Internet. In general, a "web service" is an interface that describes a collection of network-accessible operations. Web services fulfill a specific task or a set of tasks. They may work with one or more other web services in an interoperable manner to carry out their part of a complex workflow or a business transaction. For example, completing a complex purchase order transaction may require automated interaction between an order placement service (i.e. order placement software) at the ordering business and an order fulfillment service at one or more of its business partners.

Many industry experts consider the service-oriented web services initiative to be the next evolutionary phase of the Internet. With web services, distributed network access to software will become widely available for program-to-program operation, without requiring intervention from humans.

Web services are generally structured using a model in which an enterprise providing network-accessible services publishes the services to a network-accessible registry, and other enterprises needing services are able to query the registry to learn of the services' availability. The participants in this computing model are commonly referred to as (1) service providers, (2) service requesters, and (3) service brokers. These participants, and the fundamental operations involved with exchanging messages between them, are illustrated in FIG. 1. The service providers 100 are the entities having services available, and the registry to which these services are published 110 is maintained by a service broker 120. The service requesters 150 are the entities needing services and querying 140 the service broker's registry. When a desired service is found using the registry, the service requester binds 130 to the located service provider in order to use the service. These operations are designed to occur programmatically, without human intervention, such that a service requester can search for a particular service and make use of that service dynamically, at run-time. The web services model is theoretically available for any type of computing application. However, the web services which are accessible from registries today are limited to relatively simple programs such as "Hello, World!" demo programs, programs which look up the current temperature for a particular zip code, programs which perform currency exchange calculations, and so forth.

The core set of standards on which web services work is being built includes HTTP ("Hypertext Transfer Protocol"), SOAP ("Simple Object Access Protocol") and/or XML ("Extensible Markup Language") Protocol, WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet. SOAP is an XML-based protocol used to send messages for invoking methods in a distributed environment. XML Protocol is an evolving specification of the World Wide Web Consortium ("W3C") for an application-layer transfer protocol that will enable application-to-application messaging, and may converge with SOAP. WSDL is an XML format for describing distributed network services. UDDI is an XML-based registry technique with which businesses may list their services and with which service requesters may find businesses providing particular services. (For more information on SOAP, refer to "Simple Object Access Protocol (SOAP) 1.1, W3C Note May 8, 2000", which is available on the Internet at http://www.w3.org/TR/2000/NOTE-SOAP-20000508. See http://www.w3.org/2000/xp for more information on XML Protocol and the creation of an XML Protocol standard. The WSDL specification is titled "Web Services Description Language (WSDL) 1.1, W3C Note Mar. 15, 2001", and may be found on the Internet at http://www.w3.org/TR/2001/NOTE-wsdl-20010315. For more information on UDDI, refer to the UDDI specification which is entitled "UDDI Version 2.0 API Specification, UDDI Open Draft Specification Jun. 8, 2001", and which can be found on the Internet at http://www.uddi.org/specification.html. HTTP is described in Request For Comments ("RFC") 2616 from the Internet Engineering Task Force, titled "Hypertext Transfer Protocol—HTTP/1.1" (June 1999).)

Application integration using these open standards requires several steps. The interface to a web service must be described, including the method name(s) with which the service is invoked, the method's input and output parameters and their data types, and so forth. WSDL documents provide this information, and are transmitted using a UDDI publish operation to a registry implemented according to the UDDI specification. Once the service is registered in the UDDI registry, service requesters can issue UDDI find requests to locate distributed services. A service requester locating a service in this manner then issues a UDDI bind request, which dynamically binds the requester to the located service using the service information from the WSDL document. (These UDDI operations have been illustrated, at a high level, in FIG. 1.) SOAP/XML Protocol and HTTP messages are commonly used for transmitting the WSDL documents and the UDDI requests. (Hereinafter, references to SOAP should be construed as referring equivalently to semantically similar aspects of XML Protocol. Furthermore, it should be noted that references herein to "HTTP" are intended in a generic sense to refer to HTTP-like functions. Some UDDI operations, for example, require HTTPS instead of HTTP, where HTTPS is a security-enhanced version of HTTP. These differences are not pertinent to the present invention, however, and thus no distinction is made hereinafter when discussing HTTP.)

The goal of web services is to provide service requesters with transparent access to program components which may reside in one or more remote locations, even though those components might run on different operating systems and be written in different programming languages than those of the requester. While a significant amount of work has been done to define the goals, architecture, and standards on which web services will be based, much work remains to be done to make web services operate effectively and efficiently.

In particular, consider that many application services which are provided in a conventional manner require users to be authenticated and authorized before using those services. Authentication in this context means determining that the user is in fact who he purports to be, and authorization typically means determining what this user's access privileges are or whether this user is allowed to access a particular service or function thereof. In the web services environment, the intent is that a service provider may be located dynamically to perform a particular service. If multiple service providers are available, a particular one of these service providers might be selected based upon criteria such as the price of using this provider's service, response time guarantees of this provider's service, and so forth. It is possible that each provider might have differing formats for authentication and authorization information, as well as unique ways to access the authentication and authorization functions. There are no techniques known to the present inventors for federating, or joining, heterogeneous identity systems in the web services environment, which will be a serious inhibitor to use of aggregated web services.

SUMMARY OF THE INVENTION

An object of the present invention is to provide a technique for provisioning aggregated web services in a distributed network.

Another object of the present invention is to provide this technique by leveraging a portal model and framework.

A further object of the present invention is to define techniques for allowing users to conveniently access dynamically-located web services which require authentication and authorization.

Yet another object of the present invention is to define techniques for federating heterogeneous identity systems in a web services environment.

Still another object of the present invention is to define techniques for configuring web services.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for provisioning aggregated services in a computing network. In preferred embodiments, one or more software resources provide an aggregated service, and this technique comprises: defining a provisioning interface of the aggregated service; specifying the provisioning interface in a service description document; obtaining credentials of a user of the aggregated service, according to the service description document; analyzing the obtained credentials; and allowing the user to perform the aggregated service if indicated by the analysis.

The technique may further comprise defining a provisioning interface of at least one of the one or more software resources of the aggregated service, and for each of the at least one software resource, specifying the provisioning interface of a service performed by the software resource in the service description document or in one or more other service description documents. In this case, in addition to obtaining credentials of the user of the aggregated service, credentials may also be obtained for the at least one software resource, according to the service description document or the one or more other service description documents. Then the user is preferably allowed to perform selected services represented by the provisioning interfaces of the at least one software resource, if indicated by the analysis of these credentials as well.

In preferred embodiments, the analyses comprises at least one of (1) authentication and (2) authorization of the credentials.

Identity information may thus be programmatically relayed among distributed services performed by the software resources of the aggregated service. Preferably, the programmatic relaying comprises sending a message which specifies the credentials in a header of the message and a service request in a body of the message. The message may be, for example, a SOAP ("Simple Object Access Protocol") message.

A markup language is preferably used for specifying the service description document(s). The markup language is preferably Web Services Description Language ("WSDL").

The technique may further comprise registering the service description document in a registry, which may be a network-accessible registry accessed using standardized messages.

The present invention will now be described with reference to the following drawings, in which like reference numbers denote the same element throughout.

BRIEF DESCRIPTION OF THE DRAWINGS

FIGS. 3A and 3B illustrate the content of sample WSDL documents specifying a deployment interface and a system interface, respectively, according to preferred embodiments of the related inventions;

FIG. 4 provides an illustration of the web services stack approach to service aggregation, as disclosed in the related inventions;

FIGS. 5A through 5E illustrate a sample WSDL document fragment which describes a provisioning service interface, according to preferred embodiments of the present invention;

FIGS. 7A and 7B provide an example of a SOAP envelope carrying a digital signature in its header, according to the prior art.

DESCRIPTION OF PREFERRED EMBODIMENTS

Figure 1:
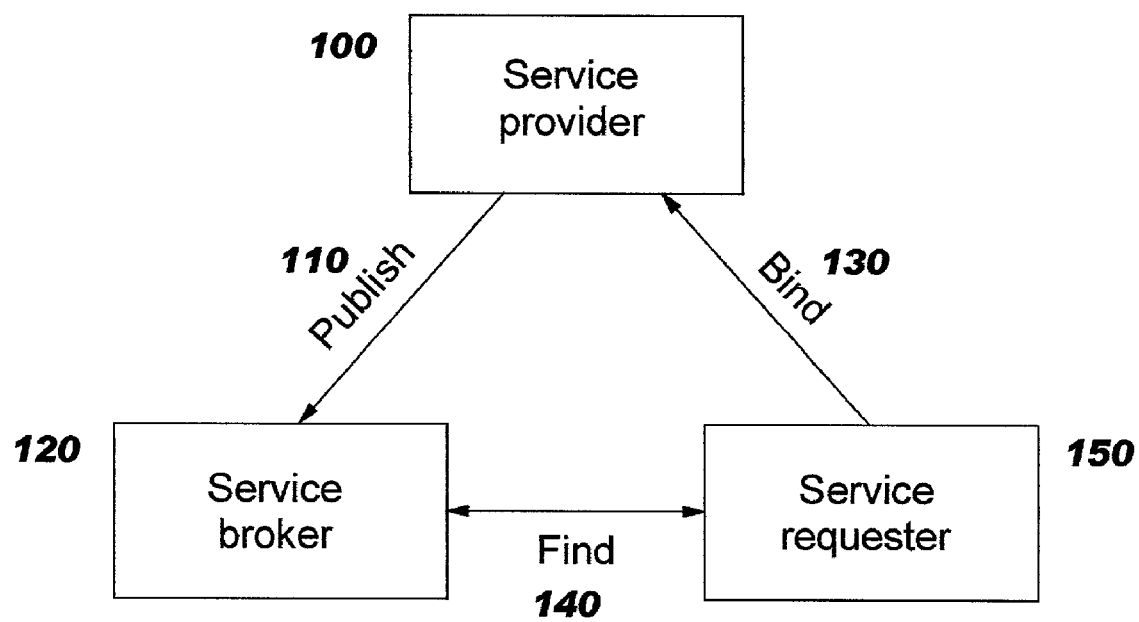
FIG. 1 provides a diagram illustrating the participants and fundamental operations of a service-oriented architecture, according to the prior art.

The promise of web services is that disparate applications will be able to interoperate like never before, offering a new breed of seamless hyper-integrated applications through openness and urbanization of enterprise systems. Web services will make distributed software resources more widely available, and will allow software to be marketed as a service. Services from one or more service providers will be dynamically aggregated to provide users with the functionality required to perform the task or service which is currently of interest to each particular user. To effectively use these dynamically-integrated services, it is necessary to be able to automatically and dynamically join the heterogeneous identity systems they may use. This must be done in real time so that users (whether human or programmatic) can be seamlessly authenticated and authorized, or "identified", for using the services. Furthermore, it is desirable to provide this seamless identification using a single sign-on, because requiring users to identify themselves repeatedly during the course of a particular service (including services which are comprised of multiple sub-services) causes user frustration and is time-consuming and inefficient. The present invention provides a solution for these requirements, and leverages a number of open industry standard technologies in doing so, as will be described.

Before discussing detail of the present invention, it is helpful to review a bit of background information, including the technologies on which preferred embodiments of the invention are built. The related inventions defined techniques for managing web services and for providing an aggregation point where services can be aggregated to form new services which can then be deployed. Preferred embodiments of the related inventions are built upon a content framework such as a portal platform because this type of framework provides many built-in services for content management and service hosting, such as persistence, personalization, and transcoding. The techniques disclosed in the related inventions extend the platforms to provide for aggregation, deployment, and management of web services. A modeling composition tool was disclosed, which may be used to define an aggregated service; software resources can then be programmatically integrated according to this aggregated service definition. In addition, the aggregated services can be managed in an automated manner.

The present invention defies techniques for provisioning the aggregated services that result from use of the related inventions. These techniques may also be adapted to aggregated services which are created in other ways, without deviating from the scope of the present invention. Furthermore, it should be noted that while discussions herein are in terms of provisioning "aggregated" services, an aggregated service is itself a web service (comprised of sub-services), and therefore the present invention may be used advantageously with those web services which may be considered as atomic services (and are therefore a degenerate case of aggregation where the set of aggregated "sub-services" has a single member).

One commercially-available portal platform on which the present invention (as well as the related inventions) may be implemented is the WebSphere® Portal Server ("WPS") from the International Business Machines Corporation ("IBM"). ("WebSphere" is a registered trademark of IBM.) Note, however, that while discussions of the related inventions and present invention are in terms of a portal platform, the inventive concepts are applicable to other types of content frameworks which provide analogous functionality and are also applicable to portals other than WPS, and thus references to portals and their portlet paradigm is by way of illustration and not of limitation.

The dynamic run-time integration of web services which is made possible by the related inventions may use a composition tool for aggregating new web services. Using this composition tool, a systems administrator (or, equivalently, a service composer or other person) may define a new service composed of more fine-grained services. The fine-grained services from which other services are built may reside locally or remotely, and the techniques of the related inventions enable referencing those services and using those services in a transparent manner without regard to whether they are local or remote. The fine-grained services may include any form of programming logic, including script programs, Java™ classes, COM classes, EJBs ("Enterprise JavaBeans"™), stored procedures, IMS or other database transactions, legacy applications, and so forth. ("Java" and "Enterprise JavaBeans" are trademarks of Sun Microsystems, Inc.) The web services created in this manner can then automatically be managed by the portal platform and can also be used in creating new web services in a recursive manner, as was described in the related inventions.

The related inventions leverage portlets as a portal interface, and also build upon the concept of a remote portlet interface (where this concept is extended to apply to programmatic portlets), to enable access to software resources. Portlets functioning in this manner may be referred to as "web service intermediaries" or "web service proxies". That is, the related inventions enable a portlet to act as an intermediary between an application or software resource requesting a particular service and a software resource providing that service. The software resource performing a particular function may be statically bound to a web service proxy (for example, at development time), or a web service proxy may be bound to a software resource which is dynamically selected (for example, based upon criteria which are evaluated at run-time). In either case, the portlet proxy receives request messages and forwards them to the software resource to which it is bound; once the software resource has completed the requested function, it returns its response to the portlet proxy which then forwards the response to the requester.

It should be noted that the software resources invoked to perform an aggregated service may be designed for program-to-program interaction, but may alternatively be visual in nature. For example, visually-oriented resources may be invoked during execution of a web service which operates primarily in a program-to-program manner. The term "programmatic portlet" is used herein to refer generally to portlet proxies according to the related and present inventions, whether or not the underlying software resource involves visually-oriented code.

Figure 2:
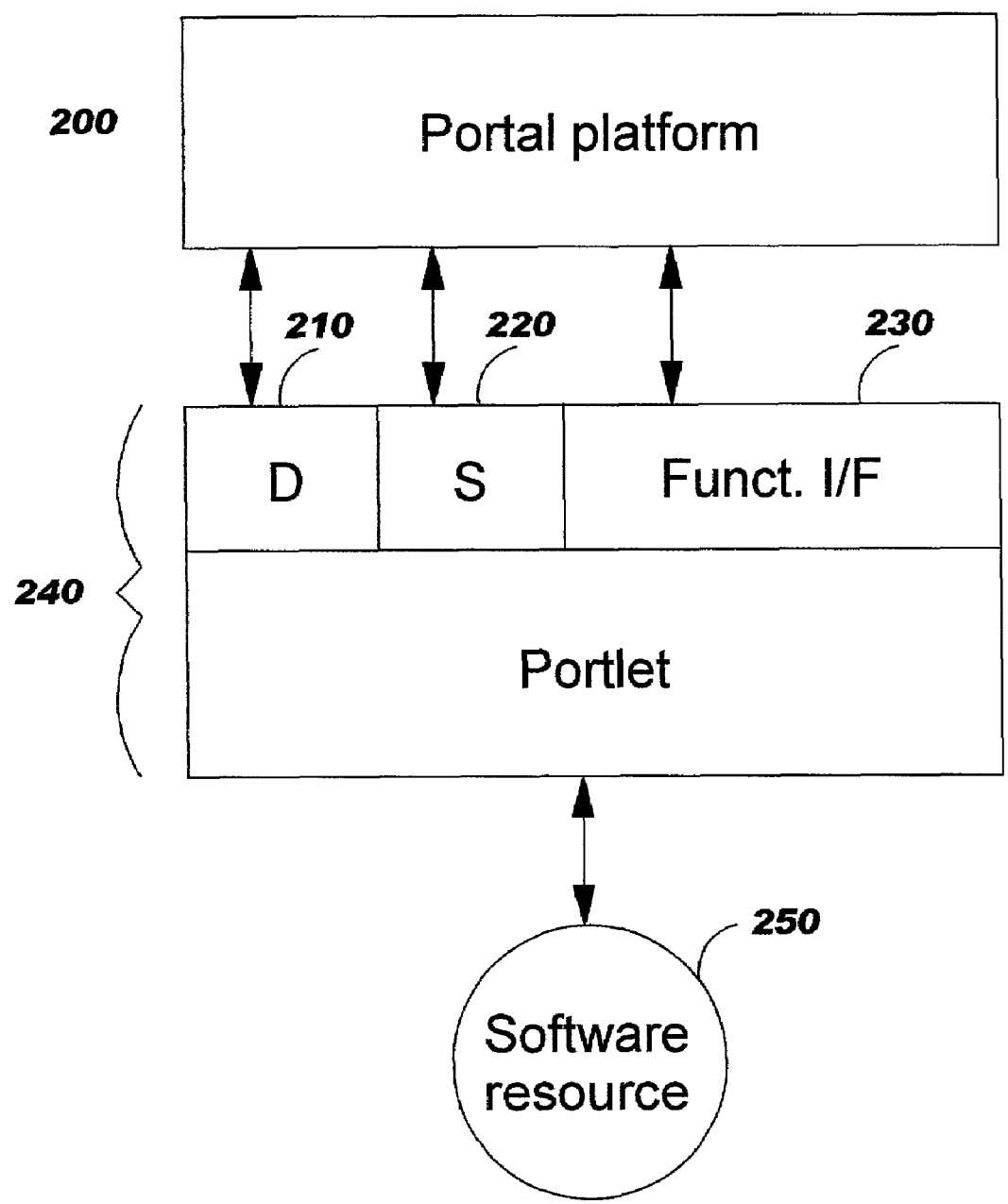
FIG. 2 is a block diagram illustrating a portlet structured as a web service proxy, according to preferred embodiments of the related inventions.

A block diagram illustrating a portlet structured as a web service proxy, according to the related inventions, is shown in FIG. 2. As shown therein, portlet proxy 240 includes a deployment interface 210, a system interface 220, and a functional interface 230. The portlet proxy communicates with a portal platform 200 using these interfaces, acting as an intermediary between the portal platform and the software resource 250 which carries out the function of interest. Details of each functional interface are specific to the web service provided by software resource 250, and do not form part of the related inventions. The related inventions, however, make the functional interface of the software resource 250 available as an interface 230 of the portlet proxy. (Exposing the functional interface using WSDL definitions and SOAP services may be accomplished using a commercially-available tool such as the IBM Web Services Toolkit, or "WSTK", during the deployment process, as was discussed in the related inventions.)

The deployment interface and system interface are described in detail in the related inventions. A brief summary will now be provided. According to preferred embodiments of the related inventions, a deployment interface and a system interface are defined for each portlet which serves as a web service proxy (although in alternative embodiments, one or the other of these interfaces may be implemented). These new interfaces may also be referred to as the deployment port type and system port type, respectively. A portlet according to the related inventions thus defines a service provider type that includes the port types necessary for portal integration of software resources and service interaction and management. ("Port types" is a term used in the art to signify the specification of a portlet's operations, and "service provider type" is a term used to signify a collection of port types.)

The deployment interface enables a portlet proxy (that is, an aggregated web service which is represented by a portlet proxy) to be used in subsequent web service composition operations, in a recursive manner, according to the related inventions. For example, the deployment interface of a portlet "A" provides information about portlet A for use as portlet A is aggregated with other portlets to form a new web service "Z". By defining a deployment interface for web service Z, according to the related inventions, information about web service Z can subsequently be provided as service Z is used for composing other new services.

The system interface is used for run-time management of portlets (that is, of web services represented by portlet proxies) by the portal platform Use of the system interface allows the portal platform to perform functions such as logging of events, billing, and other types of administrative operations pertaining to execution of the web service. Two-way communication between the portal platform and the portlet proxy is used for this purpose.

FIGS. 3A and 3B provide sample WSDL documents illustrating the deployment interface specification and system interface specification, respectively. According to preferred embodiments of the related inventions, the deployment and system port types are represented as WSDL documents, which can then be registered in a registry. As shown at 310 of the WSDL document 300 in FIG. 3A, the example deployment interface is named "Deployment" and includes operations such as "getDisplayName" and "getDisplayIcon16×16" (see element 330). These operations may be used, for example, to retrieve a descriptive name of the web service and to retrieve a graphic image representing the web service for placement on a palette of a web service composition tool. According to the WSDL specification, the input and output messages used for communicating with a service are specified in "<message>" elements 320, where the parameters used by those messages are defined as "<part>" elements. Thus, a message element is defined for each message of each operation specified for this port type. (Refer to the WSDL specification for more information about the details of a WSDL document.)

The WSDL document 350 in FIG. 3B defines the system interface, which in the example is named "System" (see element 360). In this example, a complex data type named "Event" is defined (see element 370), comprising 2 string parameters and a date parameter. This data type may be used, for example, when exchanging logging data to be recorded in an auditing log file. A "logEvent" operation is also defined (see element 390), and in this example is a 1-way operation invoked using a "logEventReceive" message (see element 380) which has a parameter of type Event. In addition, the example defines a "reportusage" operation which has 2 messages "reportInput" and "reportOutput".

Preferred embodiments of the present invention may extend the deployment interface to include provisioning information regarding the aggregated web service. Alternatively, a separate provisioning interface may be defined for this purpose, without deviating from the scope of the present invention. A sample provisioning interface specification 500 is shown in FIGS. 5A through 5E. By representing the provisioning port type or interface as a WSDL document, as disclosed herein, the provisioning information for a web service can then be programmatically registered in a registry, and information about the provisioning interface can be located and bound to programmatically at run time.

If the provisioning interface is implemented as an extension of the deployment interface, then the interface specification for a particular web service preferably specifies its operations in a provisioning portType element within a deployment interface definition. For example, the deployment interface specification 300 in FIG. 3A may be extended to include a provisioning portType element. Referring briefly now to FIGS. 5A through 5E, the sample message specifications illustrated FIGS. 5A through 5C may be added to other messages defined in a deployment specification (which are shown at element 320 of FIG. 3A) when using this approach, and an additional portType element such as that illustrated in FIGS. 5D and 5E may be specified along with the portType 330 for deployment operations. Alternatively, a separate WSDL document may be provided specifically for provisioning, where this separate document has its own <types> element, <schema> element, and so forth. In this alternative, the WSDL document's <definitions> element may be comprised of provisioning messages and operations such as those illustrated in the interface specification of FIGS. 5A through 5E.

According to the WSDL specification, the input and output messages used for communicating with a web service are specified in "<message>" elements, where the parameters used by those messages are defined as "<part>" elements. Thus, a message element is defined for each message of each operation specified for this port type. (Refer to the WSDL specification for more information about the details of a WSDL document.)

As disclosed in the related inventions, a directed graph is preferably used to model the operations involved in executing aggregated web services comprised of other web services (i.e. sub-services). Selected portlet operations represent the nodes of the graph, and the graph edges which link the nodes represent potential transitions from one service operation or process to another. These service links can be qualified with one or more transition conditions, and also with data mapping information if applicable. The conditions specify under what conditions the next linked service should be invoked. Often, these conditions will be determined using the results of a previous service invocation. Data mapping refers to the ability to link operations between portlet port types and transfer data from one operation to another. For example, the data mapping information may indicate that the output parameters of one service are mapped to the input parameters of another service.

Preferably, the Web Services Flow Language ("WSFL") is leveraged for this directed graph support. In particular, WSFL's persistent storage techniques and run-time evaluation techniques using directed graphs may be added to a web services stack to operate upon the graphs created by a service composer. For a detailed discussion of WSFL, refer to the WSFL specification, which is entitled "Web Services Flow Language (WSFL 1.0)", Prof Dr. F. Leymann (May 2001), available on the Internet from IBM at http://www-4.ibm.com/software/solutions/webservices/pdf/WSFL.pdf, which is hereby incorporated herein by reference as if set forth fully.

Refer to FIG. 4 for an illustration of the web services stack approach to service aggregation as disclosed in the related inventions. The web services stack 400 preferably uses WSFL service flow support 410 for defining and executing aggregated services, and service discovery 420 and service publication 430 are preferably provided using UDDI. The web services stack also comprises a WSDL layer 440 to support service description documents. SOAP may be used to provide XML-based messaging 450. Protocols such as HTTP, File Transfer Protocol ("FTP"), e-mail, message queuing ("MQ"), and so forth may be used for network support 460. As discussed in the related inventions, WSDL is used to define web service port types and to define how to invoke operations of these port types, and WSFL is used to aggregate the web services (and therefore to aggregate their interfaces). At run-time, services are found within a registry using the UDDI service discovery process, and bound to using information from their WSDL definitions. The WSFL run-time then uses these (port type) definitions to aggregate the services. (Because the signatures of the operations will typically not match one-to-one, a "plug link" mechanism defined in the WSFL specification can be used in a proxy model to map interfaces in a simple manner as described in the related inventions, thereby providing a correspondence between operation interfaces. The related inventions disclose using this plug link mechanism as the persistent definition of integrating portlet proxies to implement web services.)

A developer who creates the source code for a software resource to be deployed as a web service specifies the authentication, authorization, and/or configuration methods to be provided by that service. The services may then be aggregated as described in the related inventions, and the techniques of the present invention may be used for provisioning the aggregated service. For example, suppose the aggregated service is designed to provide e-mail services for a human user. A sub-service may be provided to establish a user's e-mail account. Typically, this account establishment sub-service will need input information such as the user's full name, an e-mail user identifier to be associated with this person, a password with which this person will access his e-mail account, and perhaps configuration information such as how much storage should be allocated for this user's e-mail messages. (The stored password can be used subsequently, in combination with the user identifier, to authenticate this user as he accesses his e-mail messages using another sub-service of the aggregated e-mail service.) Access rights information might also be provided as input to the account establishment sub-service. A user who is a systems administrator, for example, might be given additional access rights for performing operations such as increasing the storage space allocation of another user, deleting the e-mail of another user, and so forth. WSDL documents may then be used to define the operations provided by each sub-service, and the messages and parameters which are used to invoke those operations.

As discussed in the related inventions, creating the WSDL document may be performed by a human user or using programmatic operations, or a combination thereof (For example, the human user might may be asked to supply information such as the port type name, the location of the name space information, and so forth, while programmatic operations generate <operation> and <message> elements for a software resource's public methods. IBM's WSTK is an example of a commercially-available product which may be used to programmatically generate WSDL for an existing software resource. See "The Web services (r)evolution: Part 4, Web Services Description Language (WSDL)", G. Glass (February 2001), published by IBM on the Internet at http://www-106.ibm.com/developerworks/webservices/library/ws-peer4, which presents an example of programmatically generating a WSDL document for a simple weather service which has "getTemp" and "setTemp" operations.)

In order to join the identity systems of services which are dynamically integrated, according to the present invention, each service's provisioning interface is published to a UDDI registry using a WSDL document. The provisioning interface of the aggregated service can then be created by manually or programmatically selecting from the interfaces of the sub-services comprising the aggregation, and a WSDL document may be created for this new provisioning interface and published, in a recursive manner.

Unified authentication and authorization operations are made more difficult by the dynamic nature of both the discovery and invocation of distributed services. The techniques disclosed herein address this difficulty by enabling an aggregated service to be provisioned within the context of a web services work flow, where operations are identified using WSDL documents and are invoked using SOAP messages within a work flow definition.

Aggregated services may constrain access to their exposed operations to those users who have sufficient credentials, and successfully demonstrate these credentials using an exposed authorization operation. It may also be advantageous to enable creation of user profiles which span aggregated services, and optionally to allow these user profiles to be queried, changed, and/or deleted using corresponding service operations.

The sample messages and operations depicted in FIGS. 5A through 5E will now be described, and will be used to illustrate how the present invention enables provisioning of aggregated services in a distributed computing environment. (As will be obvious to one of skill in the art, the messages and operations—and parameters thereof—illustrated in FIGS. 5A through 5E are provided for illustrative purposes only. An actual provisioning interface may include other messages and operations without deviating from the scope of the present invention.)

The "InResolveProvisioningIDRequest" message 502 illustrates an input request message which may be used to query a service for its view of who a particular authenticated user or entity is. (Hereinafter, the term "user" may be construed as applying equivalently to a human user or a programmatic entity such as an automated service unless specifically qualified.) Message specification 502 declares that this request takes a parameter named "authToken", which is a string type. For example, suppose a human user has been authenticated to an aggregated service, and that the aggregated service is holding an authentication token "X" for that human user. Further suppose that the aggregated service wishes to programmatically determine how this human user is known to a particular sub-service "ServiceABC". The aggregated service needs to locate a provisioning system which has information about that user. Messages 502 and 504 may be used to provide this functionality, where the token "X" is passed to the "ResolveProvisioningID" operation of "ServiceABC" (preferably, using a SOAP message, as will be described with reference to FIGS. 7A and 7B). As shown in FIG. 5D, "ResolveProvisioningID" 552 is an operation having an "InResolveProvisioningIDRequest" message (see element 502 of FIG. 5A) as well as an "OutResolveProvisioningIDResponse" message (see element 504 of FIG. 5A). The "OutResolveProvisioningIDResponse" message 504 is defined as returning a parameter named "Identifier" (of string type). Preferably, the returned identifier is an identifier of the remote provisioning system. This identifier may then be used as an input parameter for subsequent operations (see messages 506, 510, and 526, for example, which are described below), to specify the provisioning system which is managing the user profile or service configuration information, as the case may be.

Figure 7B:
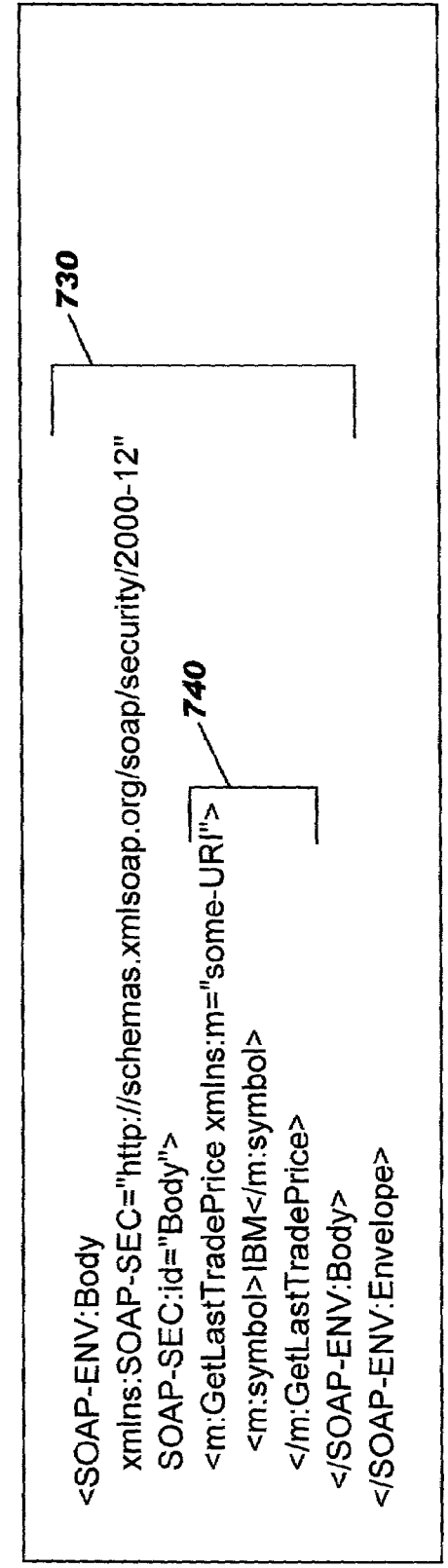

Referring now to FIGS. 7A and 7B, preferred embodiments of the present invention use SOAP messages for communication among web services. The example SOAP message 700 comprises a SOAP envelope crying a digital signature in its header, according to the prior art. See FIG. 7A for the header 710 and digital signature 720. This digital signature may be used for authentication of the requester who submits the service request carried in the SOAP message body. See FIG. 7B for the message body 730 and request 740. In this sample message 700, the message body specifies a "GetLastTradePrice" message, for which the <m:symbol> child element has a value of "IBM". It can be presumed that this is an invocation of a stock quote service, and that this service requires the user to be authenticated the digital signature of the user has therefore been supplied in the SOAP header. (Refer to "SOAP Security Extensions: Digital Signature, W3C NOTE 6 Feb. 2001", which may be found on the Internet at location http://www.w3.org/TR/SOAP-dsig/, for more information about using SOAP messages in this manner.)

The present invention leverages this digital signature technique for conveying authentication information pertaining to authenticating users of aggregated web services, determining authorization of those users, and/or configuring aggregated web services.

Returning to the discussion of the sample provisioning interface messages in FIG. 5A, the "InResolveUsersRequest" message 506 illustrates an input request message which may be used to determine the set of users who are authorized to access a particular service. In the example, an authentication token is passed to the service being queried, and in this message, preferably serves to authenticate the information requester (that is, the programmatic entity or human user who is requesting the authorized users information). The "provID" parameter may be used to provide an address (such as a Uniform Resource Identifier, or "URI") of a provisioning system hosted by a service provider. The "ResolveUsers" operation (see element 554 of FIG. 5D) of a service receives the "InResolveUsersRequest" message 506, and responds with an "OutResolveUsersResponse" message 508. In the example, this output message 508 is defined as returning an array named "UserSet". The syntax "SOAP-ENC" in the part element of message 508 is a namespace prefix, and is used to qualify the array definition. (This output array presumably identifies the authorized users of the particular service hosting this "ResolveUsers" operation 554, which was bound to using UDDI and invoked using a SOAP message. As the "ResolveUsers" operation executed, it may have requested a provisioning system to perform the determination of authorized users.)

The "InCreateUserProfileRequest" message 510 shows how the interface of an input request message that creates a user profile might be designed. As in the other example messages, it is beneficial to include an authentication token as one of the input parameters passed to the remote service, so that the remote service can authenticate the information requester and determine whether this requester to authorized to use the "CreateUserProfile" 556 service which exposes the "InCreateUserProfileRequest" message 510. The "provID" parameter may be used to provide a URI or other address of a provisioning system, as discussed above, where the user's profile is to be stored in this provisioning system. The "userID" parameter preferably identifies the user for whom (in the case of a human user) or for which (in the case of a programmatic user) the profile is being created. A "password" parameter may be provided to establish the password associated with this user. (Credentials other than a password might be used for this purpose, if desired.) The user's full name might be passed in a "FullName" parameter, depending on the needs of the underlying service. Finally, in this sample message, the user's access rights are provided as an array. The "CreateUserProfile" operation 556 receives the "InCreateUserProfileRequest" message 510, and responds with an "OutCreateUserProfileResponse" message 512. In the example, this output message 512 returns a Boolean value indicating whether the profile creation was successful or not.

The "InQueryUserProfileRequest" message 514 shows an example interface for an input request message that is used to retrieve information from a user's previously-stored profile. The message parameters include an authentication token "authToken" for authenticating the information requester, a provisioning identifier "provID" for identifying a provisioning system where the profile is stored, and a user identifier "userID" to identify the user for whom/which the profile information is being requested. This message 514 is provided as the input interface to a "QueryUserProfile" 558 service, and the "OutQueryUserProfileResponse" message 516 of this example returns the user's password, full name, and access rights from the stored profile.

The "InUpdateUserProfileRequest" message 518 is analogous to the "InCreateUserProfileRequest" message 510, and uses the saint parameters in this example. The "UpdateUserProfile" operation 560 receives the "InUpdateUserProfileRequest" message 518, and responds with an "OutUpdateUserProfileResponse" message 520 that is analogous to the "OutCreateUserProfileResponse" message 512. In the example, this output message 512 returns a Boolean value indicating whether the profile update was successful or not.

The "InDeleteUserProfileRequest" message 522 and "OutDeleteUserProfileResponse" message 524 are provided as the input and output interface of the "DeleteUserProfile" operation 562 (see FIG. 5E), and enable deleting a user's profile in a similar manner to how the profile may be created or updated with the "CreateUserProfile" operation 556 and "UpdateUserProfile" operation 560.

In addition to authentication and authorization messages such as those which have been described, it may also be useful to define messages and operations pertaining to configuration of aggregated web services. Examples of the "SetConfigParameter" 564 and "GetConfigParameter" 566 operations are illustrated in FIG. 5E.

The sample input message for the "SetConfigParameter" 564 operation is "InSetConfigParameterRequest" 526, and the sample output message is "OutSetConfigParameterResponse" 528. The input message 526 in the example has input parameters which include the authentication token "authToken" for the requester, the provisioning identifier "proviD" to identify the provisioning system where the parameter value should be stored, the user identifier "userID" to identify the user with whom/which this parameter should be associated, and the configuration parameter's name "parametername" and value "parameterValue". The output message 528 returns a Boolean value "result", indicating whether the "SetConfigParameter" operation succeeded.

The sample input message for the "GetConfigParameter" 566 operation is "InGetConfigParameterRequest" 530, and the sample output message is "OutGetConfigParameterResponse" 532. The input message 530 in the example has input parameters which are identical to those of the "InSetConfigParameterRequest" message 526, except that the "parameterValue" parameter is omitted. The output message 532 returns the value of the requested parameter using the "parameterValue" parameter.

Figure 6:
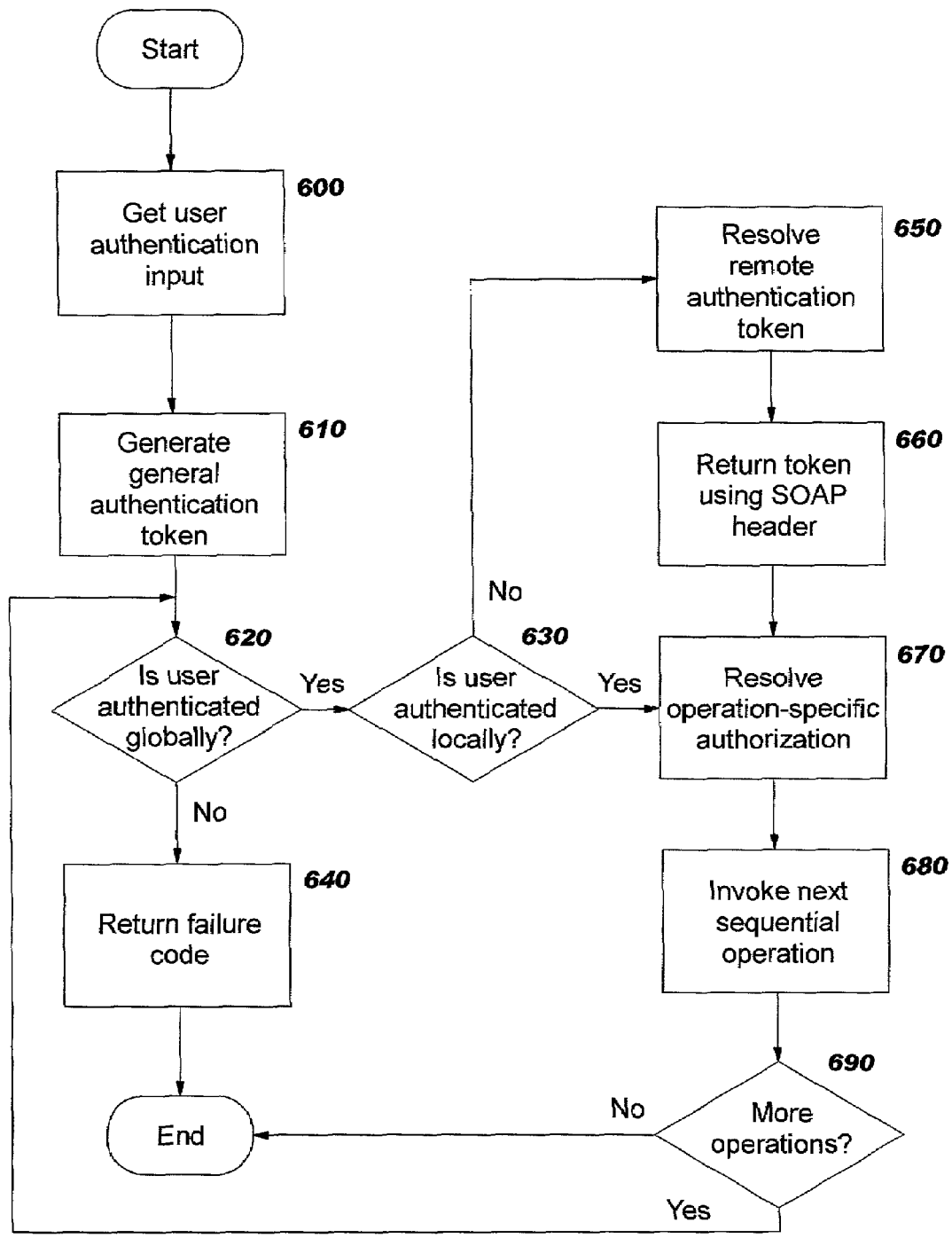
FIG. 6 provides a flowchart depicting logic which may be used to implement preferred embodiments of the present invention.

Turning now to FIG. 6, logic is depicted which may be used for executing an aggregated service and the identity and/or configuration operations of its sub-services within the context of a web services work flow, according to preferred embodiments of the present invention.

A "unified login" or single sign-on capability may be provided for an aggregated service, according to the present invention, whereby the provisioning interface of the aggregated service can be used to solicit all required information from a user at the outset of executing the aggregated service. (As will be obvious, it may happen that some information needs to be requested from the user during execution, and thus the present invention should be considered as enabling the minimization of such requests.)

The operations which are defined sequentially within the WSFL work flow of an aggregated service are executed, according to the work flow definition. The login information obtained from the user is preferably "stacked" for use by the sub-service to which individual elements of the login information pertain. Stacking of modules is known in the art by those familiar with identity systems and authentication systems which provide single sign-on capability. Stacking refers to using a "primary" password as an encryption key, where the information thus encrypted comprises one or more "secondary" passwords. As the stacking process is used with the present invention, the secondary passwords are the passwords used for the sub-services, and the primary password applies to the scope of the aggregated service and protects these secondary passwords. The sub-services are invoked in a specified order, according to the WSFL definition, and the stacked passwords are then unstacked and presented to the appropriate authentication or authorization sub-service.

This process begins at Block 600 of FIG. 6, where the user identifier and password (or similar type of authentication input) are obtained. (Note that references herein to "passwords" are not meant to limit the type of credentials that may be supported. Credentials may be provided in many ways, including clear text, strings which have been encrypted, tickets, and public key security certificates such as X.509 certificates.) This authentication information may then be passed as input to a remote service, which will generate an authentication token (Block 610) upon invocation of its authentication operation.

Preferably, the authentication token generated in Block 610 is generated as an XML fragment, which can then be included in a SOAP message header. In this manner, user identities may be relayed when accessing web services. Refer to the discussion of the sample SOAP message 700 in FIGS. 7A and 7B, which shows bow a digital signature is included in a SOAP header using XML syntax. (As shown therein, the digital signature tokens use a qualified namespace, and are therefore preceded by the letters "ds".) Authentication systems and policy systems may be bound to service operations using the SOAP header as well. WSDL descriptions preferably model operations as a combination of a SOAP header and body. That is, all operations requiring proof of identity preferably require user credentials to be exchanged. The SOAP Security Extensions technique used in the examples herein is one example of how this may be accomplished. The Security Association Markup Language ("SAML"), the Generic Security Service ("GSS") API, and the Common Secure Interoperability ("CSI") architecture also provide means for securely exchanging a principal's credentials. (A version of SAML is defined in an OASIS Draft which may be found on the Internet at http://www.oasis-open.org/committees/security/docs/draft-sstc-saml-spec-00.PDF, dated Apr. 11, 2001. The GSS-API is defined in RFC 2743, "Generic Security Service Application Program Interface, Version 2, Update 1", dated January 2000. CSI is defined in "Common Secure Interoperability V2 Specification", available on the Internet at http://www.omg.org/cgi-bin/doc?ptc/2001-03-02.)

The token generated at Block 610, using the input information obtained in Block 600, is referred to herein as a "general" authentication token in that it preferably serves as a surrogate for this user which can be used subsequently to identify the user to various sub-services of the aggregated service. (In other words, this token is preferably not specific to any one sub-service or operation.)

The test in Block 620 checks to see if this user is (still) authenticated globally (that is, for the aggregated service). In preferred embodiments, once a user is authenticated, his/her credentials are associated with the requests for the remainder of the flow (i.e. the calls according to the aggregated service's.) However, the logic in FIG. 6 is designed to perform the test at Block 620 more than once, for example to account for a user who might log off during the sequence of operations specified lathe flow model. If the test has a negative result, then this user is not allowed to continue operating the aggregated service, and a failure code is preferably returned (Block 640), after which the processing of FIG. 6 ends. If the test has a positive result, then processing continues at Block 630, which tests to see if this user is authentically locally (that is, for the next service to be performed, where this service is determined according to the WSFL flow model). If this test has a negative result, then control transkrs to Block 650; otherwise, control transfers to Block 670.

In Block 650, the stacked identity information for the next operation to be performed is retrieved. This retrieved information is passed to this next operation's authentication service, which generates (or retrieves) an operation-specific token using this identity information.

At Block 660, the operation-specific token is returned to the caller using a SOAP header (as described with reference to FIGS. 7A and 7B). (Note that while the response messages in FIGS. 5A through 5C do not illustrate returning authentication tokens, such tokens can be added if desired.) Block 670 then uses the received operation-specific token to determine the user's operation-specific authorization. (Users may have a number of roles which determine their credentials for a specific class of operations. A person who is a manager might be allowed to view the personnel records of his employees when acting in his manager role, as one example, whereas he might not be allowed to use this same operation to see his own personnel record when acting in his role of an employee.) The authorization invocation in Block 670 preferably also uses a SOAP header, for passing the operation-specific token received in Block 660. If the result of the authorization operation indicates that the user is authorized for the next operation to be performed in the aggregated service, then processing proceeds at Block 680. (Otherwise, an error may be generated and/or the flow might proceed to a different operation. The particular processing may vary from one implementation to another, and thus has not been illustrated in FIG. 6. It will be obvious to one of ordinary skill in the art how appropriate logic may be added to FIG. 6.)

Block 680 invokes the next sequential operation. This invocation may also use a SOAP header, if user credentials are required, for passing the operation-specific token received in Block 660. (If an authorization token is received as a result of the processing of block 670, that token may be passed in addition to or instead of the token from Block 650.) After the operation completes, Block 690 checks to see if there are more operations in the sequence. If not, then the processing of FIG. 6 ends. Otherwise, control returns to Block 620 to determine if the user is still authenticated for the aggregated service (after which Block 630 will determine whether the user is authenticated for this next service, as has been discussed earlier).

As has been demonstrated, the present invention provides advantageous techniques for provisioning aggregated web services. SOAP headers are preferably used to relay identity information. The disclosed techniques enable heterogeneous identity systems to be joined in the dynamic, run-time integration environment of web services. Open standards are leveraged. Note that while particular standards (such as WSFL and SOAP) have been referenced when describing preferred embodiments, this is for purposes of illustrating the inventive concepts of the present invention. Alternative means for providing the analogous functionality may be used without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of provisioning an aggregated service in a computing network, comprising steps of:
    obtaining credentials of a user who requests to access an aggregated service;
    locating, in a network-accessible registry, a service description document specifying a provisioning interface for the aggregated service, the aggregated service comprising an aggregation of a plurality of sub-services and the provisioning interface specifying how to invoke identity functions of the aggregated service;
    analyzing the obtained credentials by invoking one or more of the identity functions, according to the specification thereof in the provisioning interface, to determine whether the user is authenticated for, and/or is authorized for, accessing the aggregated service;
    allowing the user to access the aggregated service only if the analyzing step has a successful result; and
    programmatically relaying identity information obtained by invoking one or more of the identity functions among at least two of the sub-services of the aggregated service.

2. The computer-implemented method according to claim 1, wherein an implementation of each of the identity functions of the aggregated service is provided by at least one of the sub-services.

3. The computer-implemented method according to claim 1, wherein:
    at least one of the sub-services has a local provisioning interface, the local provisioning interface specified in a corresponding service description document and comprising a specification of how to invoke one or more identity functions of the sub-service; and
    the identity functions in the provisioning interface of the aggregated service are selected from the local provisioning interfaces; and further comprising the step of:
    controlling access to each of the sub-services having the local provisioning interface, further comprising the steps of:
        determining whether the user is authenticated for, and/or authorized for, accessing the sub-service by invoking at least one of the one or more identity functions of the sub-service, according to the specification thereof in the local provisioning interface; and
        allowing the user to access the sub-service only if the determining step has a successful result.

4. The computer-implemented method according to claim 3, wherein:
    the step of obtaining credentials of the user also obtains sub-service credentials for at least one of the sub-services having the local provisioning interface; and
    the determining step uses the obtained sub-service credentials.

5. A computer-implemented method of provisioning an aggregated service in a computing network, comprising steps of:
- locating, in a network-accessible registry, a service description document specifying a provisioning interface for an aggregated service, the aggregated service comprising an aggregation of a plurality of sub-services and the provisioning interface specifying how to invoke identity functions of the aggregated service, wherein one or more operations of at least one of the sub-services is access-protected;
- obtaining, for at least one of the access-protected operations, operation-specific credentials of a user who requests to access the aggregated service; and
- controlling access to each of at least one of the access-protected operations, further comprising the steps of:
  - analyzing the obtained operation-specific credentials by invoking one of more of the identity functions, according to the specification thereof in the provisioning interface, to determine whether the user can access the access-protected operation; and
  - allowing the user to access the access-protected operation only if the step of analyzing the obtained operation-specific credentials determines that the user can access the access-protected operation.

6. The computer-implemented method according to claim 1, wherein the programmatic relaying comprises sending a message which specifies the identity information in a header of the message and which specifies a service request in a body of the message.

7. The computer-implemented method according to claim 6, wherein the message is a SOAP ("Simple Object Access Protocol") message.

8. The computer-implemented method according to claim 5, wherein the service description document in the network-accessible registry is located using standardized messages.

9. A system for provisioning an aggregated service in a computing network, comprising:
- means for obtaining credentials of a user who requests to access an aggregated service;
- means for locating, in a network-accessible registry, a service description document specifying a provisioning interface for the aggregated service, the aggregated service comprising an aggregation of a plurality of sub-services and the provisioning interface specifying how to invoke identity functions of the aggregated service, wherein the service description document is specified in a Web Services Description Language ("WSDL") markup language;
- means for analyzing the obtained credentials by invoking one or more of the identity functions, according to the specification thereof in the provisioning interface, to determine whether the user is authenticated for, and/or is authorized for, accessing the aggregated service; and
- means for allowing the user to access the aggregated service only if the means for analyzing has a successful result.

10. A computer program product for provisioning an aggregated service in a computing network, the computer program product embodied on one or more computer-readable media and comprising:
- computer-readable program code for obtaining credentials of a user who requests to access an aggregated service;
- computer-readable program code for locating, in a network-accessible registry, a service description document specifying a provisioning interface for the aggregated service, the aggregated service comprising an aggregation of a plurality of sub-services and the provisioning interface specifying how to invoke identity functions of the aggregated service;
- computer-readable program code for analyzing the obtained credentials by invoking one or more of the identity functions, according to the specification thereof in the provisioning interface, to determine whether the user is authenticated for, and/or is authorized for, accessing the aggregated service, wherein an implementation of at least one of the sub-services is located dynamically, at run-time; and
- computer-readable program code for allowing the user to access the aggregated service only if the computer-readable program code for analyzing has a successful result.

11. The method according to claim 1, wherein the identity information is initially obtained as a result of the analyzing step.

12. The method according to claim 1, wherein the identity information comprises an authentication token generated by one of the invoked identity functions.

13. A computer-implemented method for provisioning an aggregated service in a computing network, comprising steps of:
- obtaining credentials of a user who requests to access an aggregated service;
- locating, in a network-accessible registry, a service description document specifying a provisioning interface for the aggregated service, the aggregated service comprising an aggregation of a plurality of sub-services and the provisioning interface specifying how to invoke identity functions of the aggregated service, wherein:
  - at least two of the sub-services each have associated therewith an identity system for access control thereto;
  - at least two of the associated identity systems are heterogeneous; and
  - at least one selected one of the identity functions of the aggregated service enables dynamically joining at least two of the heterogeneous identity systems;
- analyzing the obtained credentials by invoking one or more of the identity functions, according to the specification thereof in the provisioning interface, to determine whether the user is authenticated for, and/or is authorized for, accessing the aggregated service; and
- allowing the user to access the aggregated service only if the analyzing step determines that the user is authenticated for, and/or is authorized for, accessing the aggregated service.

14. The method according to claim 13, wherein the at least one selected identity function, upon invocation, identifies the identity system that stores information pertaining to users of the sub-service with which that identity system is associated.

15. The method according to claim 14, wherein the dynamic joining is enabled by relaying the identification of the identity system among the dynamically-joined identity systems.

* * * * *

UNITED STATES PATENT AND TRADEMARK OFFICE
CERTIFICATE OF CORRECTION

PATENT NO.        : 7,603,469 B2                                         Page 1 of 1
APPLICATION NO.   : 10/047811
DATED             : October 13, 2009
INVENTOR(S)       : Fletcher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 844 days.

Signed and Sealed this

Fifth Day of October, 2010

David J. Kappos
*Director of the United States Patent and Trademark Office*